(12) United States Patent
Wang et al.

(10) Patent No.: US 10,768,764 B2
(45) Date of Patent: Sep. 8, 2020

(54) TOUCH STRUCTURE AND MANUFACTURING METHOD THEREOF, AND TOUCH DEVICE

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Jing Wang, Beijing (CN); Tsung Chieh Kuo, Beijing (CN); Ming Zhang, Beijing (CN); Min He, Beijing (CN); Xiaodong Xie, Beijing (CN); Guiyu Zhang, Beijing (CN); Qitao Zheng, Beijing (CN); Xiaojuan Hu, Beijing (CN); Xujie Zhang, Beijing (CN); Dong Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei (CN)

( * ) Notice: Subject to any disclaimer, the term of this patent is extended or adjusted under 35 U.S.C. 154(b) by 283 days.

(21) Appl. No.: 15/750,724

(22) PCT Filed: Jun. 29, 2017

(86) PCT No.: PCT/CN2017/090892
§ 371 (c)(1),
(2) Date: Feb. 6, 2018

(87) PCT Pub. No.: WO2018/082324
PCT Pub. Date: May 11, 2018

(65) Prior Publication Data
US 2020/0081579 A1    Mar. 12, 2020

(30) Foreign Application Priority Data

Nov. 7, 2016  (CN) .......................... 2016 1 0972840

(51) Int. Cl.
*G06F 3/041* (2006.01)
*G06F 3/044* (2006.01)

(52) U.S. Cl.
CPC .. *G06F 3/0446* (2019.05); *G06F 2203/04103* (2013.01); *G06F 2203/04111* (2013.01)

(58) Field of Classification Search
CPC .... G06F 3/041; G06F 3/0412; G06F 3/04164; G06F 3/044; G06F 3/0445; G06F 3/0446;
(Continued)

(56) References Cited

U.S. PATENT DOCUMENTS 8,502,796 B1 * 8/2013 Yilmaz ............... G06F 3/044
178/18.06
8,591,279 B1 * 11/2013 Cok ................. H05K 9/0096
313/582
(Continued)

FOREIGN PATENT DOCUMENTS

| CN | 103777810 A | 5/2014 |
|---|---|---|
| CN | 104932752 A | 9/2015 |
| CN | 105373251 A | 3/2016 |

OTHER PUBLICATIONS

International Search Report and Written Opinion dated Sep. 30, 2017; PCT/CN2017/090892.

*Primary Examiner* — Michael J Eurice (57) ABSTRACT

A touch structure, a manufacturing method thereof and a touch device are provided, the touch structure includes a first touch electrode and a second touch electrode which are intersected with each other and insulated from each other, the second touch electrode includes a plurality of electrode patterns spaced apart from each other and a plurality of
(Continued)

connection patterns spaced apart from each other, each connection pattern connects together the electrode patterns which are adjacent to the connection pattern, and each connection pattern includes a grid pattern.

20 Claims, 3 Drawing Sheets

(58) Field of Classification Search
CPC ............ G06F 3/047; G06F 2203/04111; G06F 2203/04112; G06F 2203/4103; H05K 3/465; H05K 3/4685
See application file for complete search history.

(56) References Cited

U.S. PATENT DOCUMENTS

| | | | | |
|---|---|---|---|---|
| 9,078,360 | B2* | 7/2015 | Cok | H05K 3/4685 |
| 9,101,056 | B2* | 8/2015 | Cok | H05K 3/4685 |
| 9,215,798 | B2* | 12/2015 | Cok | H05K 3/4685 |
| 9,277,642 | B2* | 3/2016 | Cok | H05K 3/4685 |
| 2009/0218310 | A1* | 9/2009 | Zu | B82Y 10/00 216/11 |
| 2010/0044122 | A1* | 2/2010 | Sleeman | G06F 3/044 178/18.06 |
| 2012/0193130 | A1* | 8/2012 | Fix | G06F 3/047 174/255 |
| 2013/0057480 | A1* | 3/2013 | Brunet | G06F 3/044 345/173 |
| 2013/0063371 | A1* | 3/2013 | Lee | G06F 3/044 345/173 |
| 2013/0100038 | A1* | 4/2013 | Yilmaz | G06F 3/044 345/173 |
| 2013/0127775 | A1* | 5/2013 | Yilmaz | G06F 3/044 345/174 |
| 2013/0135548 | A1* | 5/2013 | Burberry | G06F 3/044 349/38 |
| 2013/0222325 | A1* | 8/2013 | Cok | G06F 3/044 345/174 |
| 2013/0242485 | A1* | 9/2013 | Ohtani | G06F 3/041 361/679.01 |
| 2013/0314365 | A1* | 11/2013 | Woolley | H03K 17/941 345/174 |
| 2013/0327560 | A1* | 12/2013 | Ichiki | G06F 3/044 174/133 R |
| 2014/0002176 | A1* | 1/2014 | Guard | H03K 17/962 327/517 |
| 2014/0111442 | A1* | 4/2014 | Cok | G06F 3/044 345/173 |
| 2014/0111709 | A1* | 4/2014 | Kim | G02F 1/13338 349/12 |
| 2014/0111711 | A1* | 4/2014 | Iwami | B32B 7/02 349/12 |
| 2014/0118287 | A1* | 5/2014 | Miyamoto | G06F 3/044 345/173 |
| 2014/0152602 | A1* | 6/2014 | Miyamoto | G06F 3/0416 345/173 |
| 2014/0168092 | A1* | 6/2014 | Yilmaz | G06F 3/044 345/173 |
| 2014/0292692 | A1* | 10/2014 | Okuyama | B62D 1/046 345/173 |
| 2014/0299357 | A1* | 10/2014 | Nakamura | G06F 3/044 174/250 |
| 2014/0299361 | A1* | 10/2014 | Nakamura | H05K 1/0296 174/253 |
| 2014/0306922 | A1* | 10/2014 | Yilmaz | G06F 3/044 345/174 |
| 2014/0308435 | A1* | 10/2014 | Burberry | G06F 3/044 427/79 |
| 2014/0327647 | A1* | 11/2014 | Ray | G06F 3/0416 345/174 |
| 2014/0332256 | A1* | 11/2014 | Cok | H05K 1/0274 174/253 |
| 2014/0354301 | A1* | 12/2014 | Trend | G01R 27/2605 324/658 |
| 2014/0360856 | A1* | 12/2014 | Mizumoto | G06F 3/044 200/600 |
| 2015/0002464 | A1* | 1/2015 | Nishioka | H05K 1/0274 345/174 |
| 2015/0018045 | A1* | 1/2015 | Cha | H04M 1/0266 455/566 |
| 2015/0060111 | A1* | 3/2015 | Cok | H05K 3/4685 174/253 |
| 2015/0060112 | A1* | 3/2015 | Cok | G02F 1/13338 174/253 |
| 2015/0060393 | A1* | 3/2015 | Cok | H05K 3/4685 216/13 |
| 2015/0060394 | A1* | 3/2015 | Cok | H05K 3/4685 216/13 |
| 2015/0060395 | A1* | 3/2015 | Cok | H05K 3/4685 216/13 |
| 2015/0084201 | A1* | 3/2015 | Cok | G02B 6/138 257/773 |
| 2015/0085456 | A1* | 3/2015 | Cok | H05K 1/0274 361/767 |
| 2015/0091858 | A1* | 4/2015 | Rosenberg | G06F 3/0414 345/174 |
| 2015/0091859 | A1* | 4/2015 | Rosenberg | G06F 3/044 345/174 |
| 2015/0169116 | A1* | 6/2015 | Masuda | G06F 3/044 345/174 |
| 2015/0185899 | A1* | 7/2015 | Lee | G06F 3/0416 345/174 |
| 2015/0242025 | A1* | 8/2015 | Cok | G06F 3/046 29/622 |
| 2015/0355510 | A1* | 12/2015 | Kurasawa | G06F 3/0412 349/12 |
| 2015/0370363 | A1* | 12/2015 | Trend | G06F 3/044 345/174 |
| 2015/0378484 | A1* | 12/2015 | Orita | G06F 3/044 345/174 |
| 2016/0048248 | A1* | 2/2016 | Na | G06F 3/044 345/174 |
| 2016/0103175 | A1* | 4/2016 | Zeise | G01B 11/14 324/750.23 |
| 2016/0103176 | A1* | 4/2016 | Zeise | G01R 31/2891 324/750.23 |
| 2016/0103177 | A1* | 4/2016 | Zeise | G01R 31/2891 324/750.23 |
| 2016/0103178 | A1* | 4/2016 | Zeise | G01R 31/2891 324/750.23 |
| 2016/0202792 | A1* | 7/2016 | Han | G06F 3/044 345/174 |
| 2016/0216809 | A1* | 7/2016 | Shibata | G06F 3/044 |
| 2016/0231861 | A1* | 8/2016 | Nagata | G06F 3/044 |
| 2016/0274702 | A1* | 9/2016 | Satou | G06F 3/044 |
| 2017/0003821 | A1* | 1/2017 | Jeon | G06F 1/1643 |
| 2017/0010720 | A1* | 1/2017 | Nakayama | G06F 3/044 |
| 2017/0023817 | A1* | 1/2017 | Hayashi | G02F 1/13338 |
| 2017/0147107 | A1* | 5/2017 | Ishizaki | G06F 3/0412 |
| 2017/0228052 | A1* | 8/2017 | Nakamura | G06F 3/03545 |
| 2017/0228090 | A1* | 8/2017 | Nakamura | G06F 3/03545 |
| 2018/0033617 | A1* | 2/2018 | Imazeki | G02F 1/1345 |
| 2018/0182822 | A1* | 6/2018 | Seo | G06F 3/0416 |
| 2018/0188859 | A1 | 7/2018 | Na et al. | |
| 2019/0018524 | A1* | 1/2019 | Shiojiri | G06F 3/044 |
| 2019/0155424 | A1* | 5/2019 | Nukui | G06F 3/0412 |
| 2019/0258355 | A1* | 8/2019 | Imazeki | G06F 3/0416 |
| 2019/0278403 | A1* | 9/2019 | Kurasawa | G06F 3/0416 |

* cited by examiner

TOUCH STRUCTURE AND MANUFACTURING METHOD THEREOF, AND TOUCH DEVICE

TECHNICAL FIELD

Embodiments of the present disclosure relate to a touch structure, a manufacturing method of the touch structure and a touch device.

BACKGROUND

Since the rise of touch control technologies, the touch control technologies are getting more and more popular. According to different sensing modes, touch screens generally include resistive type, capacitive type, infrared type and acoustic type touch screens. Mutual capacitive touch screens in capacitive type touch screens realize a multi-touch technology and thus become the mainstream of the market of touch screens and a future development trend. The mutual capacitive touch screens for example include add-on touch screens and in-cell touch screens. For example, the add-on touch screens include OGS (One Glass Solution) type and on-cell type screens and the like.

SUMMARY

Embodiments of the present disclosure provide a touch structure, a manufacturing method of the touch structure and a touch device. In the embodiments of the present disclosure, the connection patterns of a touch electrode are not easy to be seen by a user.

At least one embodiment of the present disclosure provides a touch structure which includes a first touch electrode and a second touch electrode which are intersected with each other, and the first touch electrode and the second touch electrode are insulated from each other. The second touch electrode includes a plurality of electrode patterns spaced apart from each other and a plurality of connection patterns spaced apart from each other. Each connection pattern is connected to the electrode patterns which are adjacent to the connection pattern, and each connection pattern includes a grid pattern.

For example, each connection pattern includes a plurality of conducting wires, each conducting wire of the connection pattern is connected with the electrode patterns which are adjacent to the connection pattern, and the plurality of conducting wires form a plurality of hollow portions to form the grid pattern.

For example, a material of the connection patterns includes a metal. For example, a width of each of the conducting wires is from 4 microns to 6 microns.

For example, a material of the connection patterns includes a transparent conductive metal oxide. For example, a width of each of the conducting wires is from 15 microns to 30 microns.

For example, at least a part of the conducting wires have a zigzag planar shape.

For example, a planar outline shape of each of the hollow portions is a polygon.

For example, the plurality of hollow portions include a plurality of polygons with different numbers of sides.

For example, at least one of the first touch electrode and the electrode patterns has a grid planar shape.

For example, the touch structure further includes a plurality of signal transmission wires respectively connected to the first touch electrode and the second touch electrode.

For example, the signal transmission wires and the connection patterns are in a same layer.

For example, the touch structure further includes an insulation layer, and the insulation layer includes a portion at an intersection position of the first touch electrode and the second touch electrode so that the first touch electrode and the second touch electrode are insulated from each other.

At least one embodiment of the present disclosure further provides a manufacturing method of a touch structure, and the method includes: forming a first touch electrode and a second touch electrode which are intersected with each other. In the method, the first touch electrode and the second touch electrode are insulated from each other; and the second touch electrode includes a plurality of electrode patterns spaced apart from each other and a plurality of connection patterns spaced apart from each other, each connection pattern is connected with the electrode patterns which are adjacent to the connection pattern, and a planar shape of each connection pattern includes a grid pattern.

For example, the manufacturing method further includes forming a plurality of signal transmission wires, the signal transmission wires and the connection patterns are formed by performing a patterning process on a same conductive film, and the signal transmission wires respectively connected with the first touch electrode and the second touch electrode.

For example, the manufacturing method further includes forming a protection insulation layer to cover at least one of the connection patterns and the signal transmission wires.

For example, a first conductive film is formed and is subjected to a first patterning process to form the first touch electrode and the plurality of electrode patterns spaced apart from each other; an insulation film is formed and is subjected to a second patterning process to form the insulation layer, so that the first touch electrode and the electrode patterns are at a first side of the insulation layer; and a second conductive film is formed and is subjected to a third patterning process to form the plurality of the connection patterns spaced apart from each other. Each connection pattern has the grid planar shape and includes a portion formed at a second side of the insulation layer, and the second side is opposite to the first side; and each connection pattern is connected with the electrode patterns which are adjacent to the connection pattern to form the second touch electrode, and the second touch electrode is insulated from the first touch electrode by the insulation layer.

At least one embodiment of the present disclosure further provides a touch device, which includes the touch structure described in any one of the above embodiments.

For example, the touch device further includes a display panel. The display panel includes an array substrate and an opposite substrate which are opposite to each other. The touch structure is at a side, away from the array substrate, of the opposite substrate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
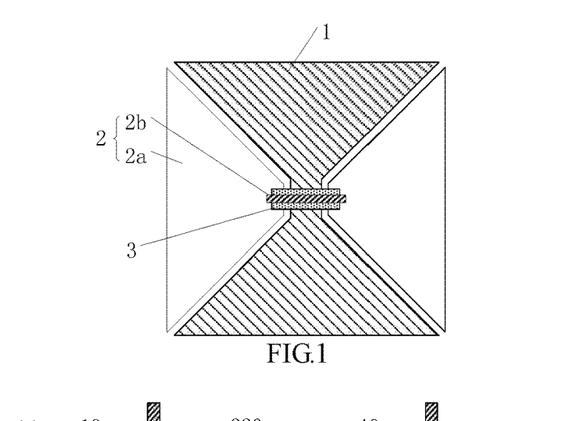
FIG. 1 is a cross-sectional schematic view of a touch structure in which ITO electrode patterns cooperate with a conductive bridge.

At present, in both an on-cell touch screen and an OGS touch screen, a touch structure usually adopts a structure that ITO (indium tin oxide) electrode patterns cooperate with conductive bridges. For example, as shown in FIG. 1, the touch structure includes a first touch electrode 1 and a second touch electrode 2 insulated from each other by an insulation layer 3 at an intersection position of the first touch electrode 1 and the second touch electrode 2. The first touch electrode 1 is made of ITO and is continuously formed. The second touch electrode 2 is formed in sections and includes a plurality of electrode patterns 2a (the electrode pattern 2a is made of ITO) arranged at intervals and a plurality of connection patterns 2b (also being referred to as conductive bridges, and one connection pattern 2b being shown in FIG. 1) arranged at intervals, and the adjacent electrode patterns 2a are connected with each other by the connection pattern 2b. The touch structure further includes signal transmission wires respectively connected to the first touch electrode 1 and the second touch electrode 2, and the signal transmission wires are made of metal.

For the touch structure as shown in FIG. 1, the inventors of the present disclosure noted that: in a situation where the connection patterns 2b are made of a transparent conductive metal oxide such as ITO, the signal transmission wires and the connection patterns 2b are made by adopting different photolithographic processes because the signal transmission wires and the connection patterns 2b are made of different materials, which causes an increase in the manufacturing cost, so the connection patterns 2b are usually made of a metal material; however, in order that the connection patterns 2b made of the metal material have a smaller resistance, the width (the size in the vertical direction in FIG. 1) of each connection pattern 2b is usually about 10 microns (μm), which makes the connection patterns easy to be seen by a user (that is, the invisibility effect is poor).

Figure 2:
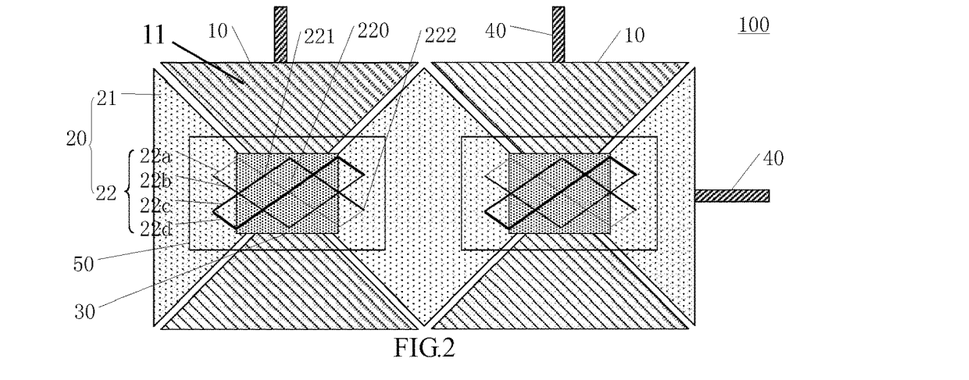
FIG. 2 is a first schematic top view of a touch structure according to embodiments of the present disclosure.

At least one embodiment of the present disclosure provides a touch structure. As shown in FIG. 2, the touch structure 100 includes a first touch electrode 10 and a second touch electrode 20 which are intersected with each other (two first touch electrodes 10 and one second touch electrode 20 are shown in FIG. 2 as an example). The first touch electrode 10 and the second touch electrode 20 are insulated from each other at an intersection position of the first touch electrode 10 and the second touch electrode 20. For example, the touch structure 100 further includes an insulation layer 30, and the insulation layer 30 includes a portion provided at the intersection position of the first touch electrode 10 and the second touch electrode 20, to insulate the first touch electrode 10 from the second touch electrode 20. The second touch electrode 20 includes a plurality of electrode patterns 21 which are spaced apart from each other and a plurality of connection patterns 22 which are spaced apart from each other. Each connection pattern 22 is located at the intersection position of the first touch electrodes 10 and the second touch electrodes 20. Each connection pattern 22 makes its adjacent electrode patterns 21 connected with each other, and each connection pattern 22 includes a grid pattern. For example, the first touch electrode 10 also includes a plurality of electrode patterns 11 (for example, each electrode pattern 11 has a diamond structure) and a plurality of connection patterns (not shown in FIG. 2) for connecting the electrode patterns 11 together, and the electrode patterns 11 are integrally formed with the connection patterns. For example, each connection pattern of the first touch electrode 10 does not have a grid structure.

For example, each connection pattern 22 includes a plurality of conducting wires (FIG. 2 illustrates four conducting wires as an example, referring to 22a-22d), and each conducting wire of the connection pattern 22 electrically connects together the electrode patterns 21 adjacent to the connection pattern 22, so that the plurality of the conducting wires are in parallel connection with each other, and so that the plurality of the conducting wires form a plurality of closed hollow portions (for example, the diamond-shaped closed openings in FIG. 2) 220 by intersecting with each other, so as to form the grid pattern. For example, portions, except end points, of at least two of the plurality of conducting wires intersect to form a plurality of internal grid nodes 221 and the plurality of closed hollow portions 220. For example, on the basis of forming the internal grid nodes 221, the end points of the at least two of the plurality of conducting wires also overlap to form an outer grid node 222.

In the embodiments of the present disclosure, the touch structure includes the first touch electrode and the second touch electrode which are intersected with each other and insulated from each other by the insulation layer at the intersection position, the second touch electrode includes the plurality of electrode patterns spaced apart from each other and the plurality of connection patterns spaced apart from each other, each of the connection patterns electrically connects its adjacent electrode patterns together, and each of the connection patterns has a planar shape of the grid pattern. Compared with the case in which the connection pattern 2b in the touch structure shown in FIG. 1 adopts a solid metal connection bridge, the conducting wires of the grid connection pattern in the embodiments of the present disclosure is made relatively thin so that the grid connection pattern is not easily seen by the user, and the grid connection pattern has a relatively small resistance so as to reduce the occurrence possibility of an electrostatic discharge (ESD) phenomenon at the connection pattern. In addition, compared with the case that a grid structure is continuously formed in the entire touch region and connects adjacent electrode patterns together, the connection patterns included by the second touch electrode in the embodiments of the present disclosure are spaced apart from each other and thus are not easy to generate a moire phenomenon.

For example, as shown in FIG. 2, at least a part of the conducting wires included in the connection pattern 22 have a zigzag planar shape (the planar shape is a top view shape). For example, at least two of the conducting wires are in the zigzag shape or each of the conducting wires is in the zigzag shape. A zigzag line is a curve line formed by a plurality of line segments which are connected sequentially and connected end to end. In the embodiments of the present disclosure, the conducting wires included in the connection pattern 22 are in the zigzag shape such that the conducting wires are inclined relative to an extension direction of the first touch electrode 10 and an extension direction of the second touch electrode 20. Compared with straight conducting wires, it is facilitated that more hollow portions are formed via less conducting wires.

Figure 3:
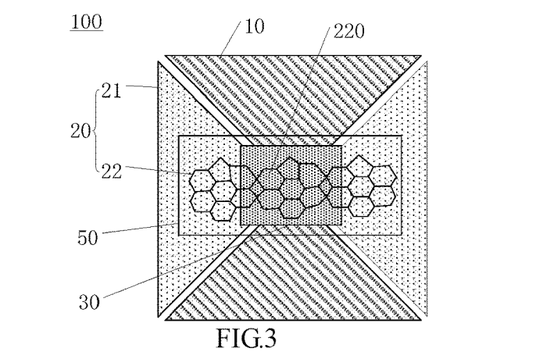
FIG. 3 is a second schematic top view of the touch structure according to the embodiments of the present disclosure.

For example, a planar outline shape of each hollow portion 220 is a polygon shape. For example, the planar shapes of the hollow portions 220 are a same polygon shape. For example, as shown in FIG. 2, the planar shape of each hollow portion is a diamond shape. For example, as shown in FIG. 3, the planar shapes of the plurality of hollow portions 220 included in the connection pattern 22 are different polygons having different numbers of sides, for example, referring to the quadrilateral hollow portion, the pentagon hollow portion, and the hexagon hollow portion in FIG. 3. By making the plurality of hollow portions 220 have different shapes, it is facilitated to avoid the moire phenomenon and to optimize the invisibility effect. The arrangement of the hollow portions 220 in each connection pattern 22 includes, but is not limited to, the embodiments shown in FIG. 2 and FIG. 3.

For example, a material of the connection pattern 22 is a metal, such as aluminum, aluminum neodymium alloy, copper, zirconium, titanium or the like. For example, as shown in FIG. 2, the touch structure 100 provided by at least one embodiment of the present disclosure further includes: a plurality of signal transmission wires 40 respectively connected to the first touch electrode 10 and the second touch electrode 20 for a signal transmission of the first touch electrode 10 and a signal transmission of the second touch electrode 20. For example, the signal transmission lines 40 and the connection patterns 22 are disposed in a same layer (that is, formed by performing a same patterning process on a same film). In a situation where both the signal transmission lines 40 and the connection patterns 22 are made of metal, both of them are formed by performing the same patterning process (such as a same photolithographic process) on the same metal film to simplify the process flow and to reduce the manufacturing cost.

For example, in the case that the material of the connection pattern 22 is the metal, a width of each of the conducting wires included in the connection pattern 22 is from 4 μm to 6 μm. It can be seen from this that, compared with the manner in which the connection pattern 2b in the touch structure in FIG. 1 adopts the solid metal bridge with a width of about 10 microns, each of the conducting wires included in the connection pattern 22 in the embodiments of the present disclosure is made relatively thin and thus is not easy to be seen by the user.

For example, in the case that the material of the connection pattern 22 is the metal, as shown in FIG. 2, the touch structure 100 provided by at least one embodiment of the present disclosure for example further includes a protection insulation layer 50 covering the connection pattern 22 to prevent the metallic connection pattern 22 from being oxidized.

For example, the material of the connection pattern 22 is a transparent conductive metal oxide such as indium tin oxide (ITO), indium zinc oxide (IZO), indium gallium zinc oxide (IGZO), or the like. By making the connection pattern 22 by using the transparent conductive metal oxide, the connection pattern 22 is difficult to be seen by the user. Moreover, compared with the case that the connection pattern 2b in the touch structure shown in FIG. 1 adopts a solid ITO conductive bridge, the connection pattern 22 in the embodiments of the present disclosure has a relatively small resistance due to the grid pattern.

For example, in the case that the material of the connection pattern 22 is the transparent conductive metal oxide, each of the conducting wires included in the connection pattern 22 has a width from 15 μm to 30 μm, for example, from 15 to 20 μm.

For example, both the first touch electrode 10 and the electrode patterns 21 of the second touch electrode 20 are made of the transparent conductive metal oxide, such as indium tin oxide (ITO), indium zinc oxide (IZO), indium gallium zinc oxide (IGZO) and so on. For example, in this case, both the electrode patterns 21 of the second touch electrode 20 and the electrode patterns 11 of the first touch electrode 10 are a solid block-shaped structure (for example, a solid block-shaped diamond structure).

For example, in order to reduce the resistance, a planar shape (that is, a plan view shape) of at least one of the first touch electrode 10 and the electrode patterns 21 is a grid shape. For example, the planar shapes of the electrode patterns 11 of the first touch electrode 10 are in the grid shape, so that the planar shape of the first touch electrode 10 is the grid shape; and on this basis, for example, the connection patterns of the first touch electrode 10 are also the grid shape. For example, the grid first touch electrode 10 and/or the electrode patterns 21 are/is made of a metal material.

For example, each of the insulation layer 30 and the protection insulation layer 50 is an organic insulation layer or a inorganic insulation layer or a laminated structure of the organic insulation layer and the inorganic insulation layer. For example, as shown in FIG. 2 and FIG. 3, the insulation layer 30 is formed in segments (that is, the insulation layer 30 includes a plurality of insulation layer patterns which are spaced apart from each other and respectively located at the connection patterns 22). Alternatively, the insulation layer 30 is continuously formed in the touch region, and the connection pattern 22 connects adjacent electrode patterns 21 together through via holes in the insulation layer 30.

For example, the touch structure provided by the embodiments of the present disclosure is used in an OGS touch device or in an on-cell touch device.

Figure 4:
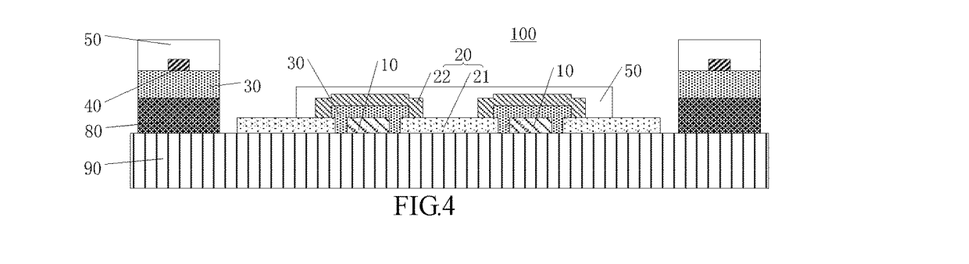
FIG. 4 is a schematic cross-sectional view of the touch structure used in an OGS touch device according to the embodiments of the present disclosure.

FIG. 4 is a schematic cross-sectional view of the touch structure used in the OGS touch device according to the embodiments of the present disclosure. For example, as shown in FIG. 4, the touch structure 100 includes a base substrate 90, and the first touch electrode 10, the second touch electrode 20 and the insulation layer 30 which are on the base substrate 90. The plurality of electrode patterns 21 of the second touch electrode 20 are spaced apart from each other and the plurality of connection patterns 22 of the second touch electrode 20 are spaced apart from each other, and the connection patterns 22 and the electrode patterns 21 are disposed in different layers (that is, formed by performing different patterning processes respectively on different layers). The first touch electrode 10 and the connection patterns 22 of the second touch electrode 20 for example are respectively disposed at two opposite sides of the insulation layer 30 (referring to a lower side and an upper side of the insulation layer 30 in FIG. 4), and the first touch electrode 10 and the electrode patterns 21 of the second touch electrode 20 for example are disposed at a same side of the insulation layer 30, and for example, are disposed in the same layer. For example, the touch structure further includes a black matrix 80 disposed at a side, facing the base substrate 90, of the insulation layer 30, and the signal transmission lines 40 and the protection insulation layer 50 covering the signal transmission lines 40. It should be noted that the positions of the electrode patterns 21 and the connection patterns 22 of the second touch electrode 20 are interchangeable.

For example, in the case that the touch structure provided by the embodiments of the present disclosure is used in the on-cell type touch device, the touch structure may not include the black matrix.

For example, the touch structure provided by the embodiments of the present disclosure adopts the principle of mutual capacitance that one of the first touch electrode and the second touch electrode is a touch driving electrode, and the other of the first touch electrode and the second touch electrode is a touch sensing electrode.

At least one embodiment of the present disclosure further provides a method for manufacturing a touch structure. Referring to the touch structure 100 shown in FIG. 2 to FIG. 4, the manufacturing method includes: forming a first touch electrode 10 and a second touch electrode 20 which are intersected with each other. In the method, at an intersection position of the first touch electrode 10 and the second touch electrode 20, the first touch electrode 10 and the second touch electrode 20 are insulated from each other. For example, the method further includes forming an insulation layer 30 which includes a portion formed at the intersection position of the first touch electrode 10 and the second touch electrode 20, to insulate the first touch electrode 10 and the second touch electrode 20 from each other. In the manufacturing method, the second touch electrode 20 includes a plurality of electrode patterns 21 spaced apart from each other and a plurality of connection patterns 22 spaced apart from each other. Each connection pattern 22 connects its adjacent electrode patterns 21 together, and a planar shape of each connection pattern 22 includes a grid pattern. For example, each connection pattern 22 includes a plurality of conducting wires, each of the conducting wires of the connection pattern 22 connects the electrode patterns 21 adjacent to the connection pattern 22 together, so that the plurality of conducting wires are connected in parallel with each other, and that the plurality of conducting wires form a plurality of hollow portions 220 to form the grid pattern.

For example, the manufacturing method provided by at least one embodiment of the present disclosure further includes: forming a plurality of signal transmission wires 40. The signal transmission wires 40 and the connection patterns 22 are formed by performing a patterning process on a same conductive film, and the signal transmission wires 40 are respectively connected to the first touch electrode 10 and the second touch electrode 20 for a signal transmission of the first touch electrode 10 and a signal transmission of the second touch electrode 20. By patterning the same conductive film to form the signal transmission lines 40 and the connection patterns 22, the process flow is simplified and the cost is reduced.

For example, for the touch structure 100 shown in FIG. 4, the manufacturing method provided by at least one embodiment of the present disclosure includes the following steps S41 to S43, which are described below with reference to FIG. 5a to FIG. 5f.

Figure 5A:
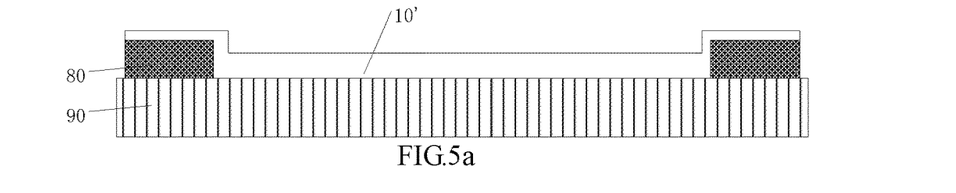
FIG. 5a to FIG. 5f are schematic views illustrating manufacturing steps of the touch structure shown in FIG. 4.
Figure 5B:
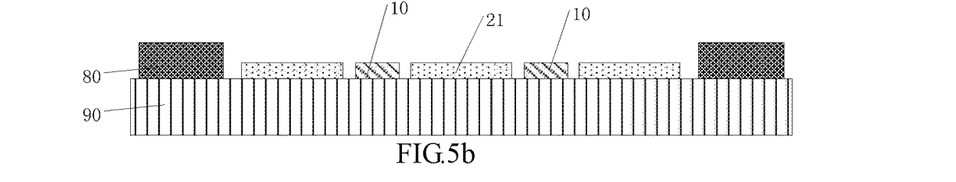

Step S41: forming a first conductive film 10', as shown in FIG. 5a; and performing a first patterning process on the first conductive film 10' to form the first touch electrode 10 and the plurality of electrode patterns 21 spaced apart from each other, as shown in FIG. 5b.

For example, the first patterning process includes steps of coating a photoresist on the first conductive film 10', exposing, developing and etching.

Figure 5C:
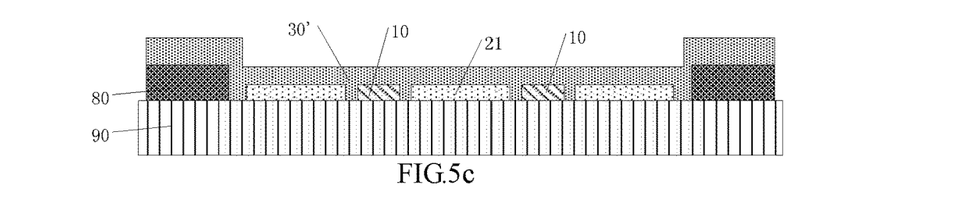
Figure 5D:
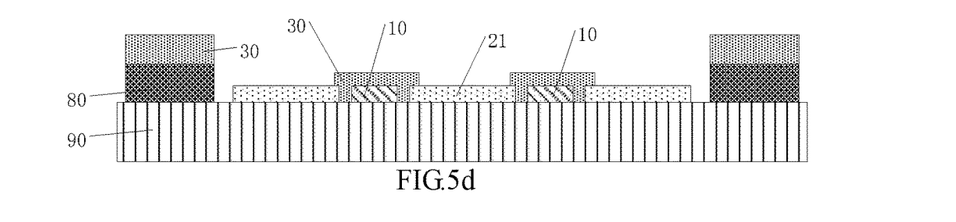

Step S42: forming an insulation film 30', as shown in FIG. 5c; and performing a second patterning process on the insulation film 30' to form the insulation layer 30 and to make the first touch electrode 10 and the electrode patterns 21 at a first side of the insulation layer 30, as shown in FIG. 5d.

For example, the insulation film 30' is made of a material having a photoresist property, so that the second patterning process includes the exposure and development steps and the etching step is omitted.

Figure 5E:
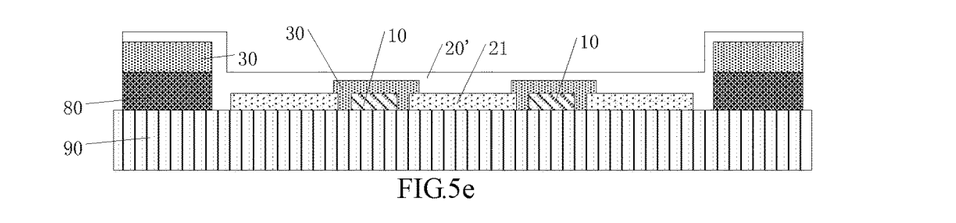
Figure 5F:
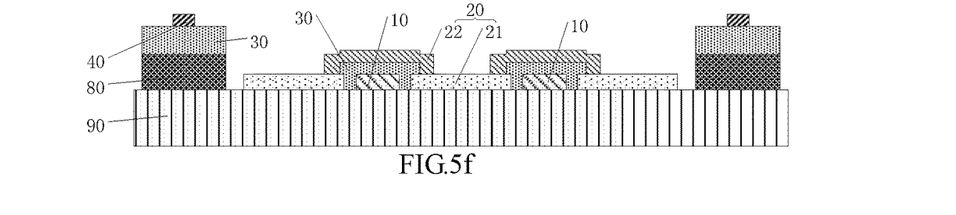

Step S43: forming a second conductive film 20', as shown in FIG. 5e; and performing a third patterning process on the second conductive film 20' to form the plurality of connection patterns 22 spaced apart from each other, as shown in FIG. 5f, so that each connection pattern 22 has the grid planar shape and includes a portion formed at a second side, which is opposite to the above first side, of the insulation layer 30, and so that each connection pattern 22 connects its adjacent electrode patterns 21 together to form the second touch electrode 20, which is insulated from the first touch electrode 10 by the insulation layer 30 at the intersection position of the first touch electrode 10 and the second touch electrode 20.

For example, the third patterning process includes steps of coating a photoresist on the second conductive film 20', exposing, developing and etching.

For example, in the step S43, during the third patterning process on the second conductive film 20', the signal transmission lines 40 are also be formed, as shown in FIG. 5f to reduce the manufacturing process.

It should be noted that the order of step S41 and step S43 in the embodiments of the present disclosure may be interchanged.

For example, in a situation that at least one of the connection patterns 22 and the signal transmission lines 40 is made of metal, as shown in FIG. 4, the manufacturing method provided by at least one embodiment of the present disclosure further includes: forming a protection insulation layer 50 to correspondingly cover the at least one of the connection patterns 22 and the signal transmission lines 40.

For example, in the case that the touch structure as shown in FIG. 4 is used in an OGS touch device, the manufacturing method provided by the embodiments of the present disclosure further includes: before the step S41, forming a black matrix 80 on the base substrate 90. For example, the black matrix is formed by the steps of coating, exposing and developing.

Each structure in the method provided by the embodiments of the present disclosure may refer to the related descriptions in the embodiments of the touch structure, and details are not described herein again.

At least one embodiment of the present disclosure further provides a touch device, which includes the touch structure 100 provided in any one of the above embodiments.

Figure 6:
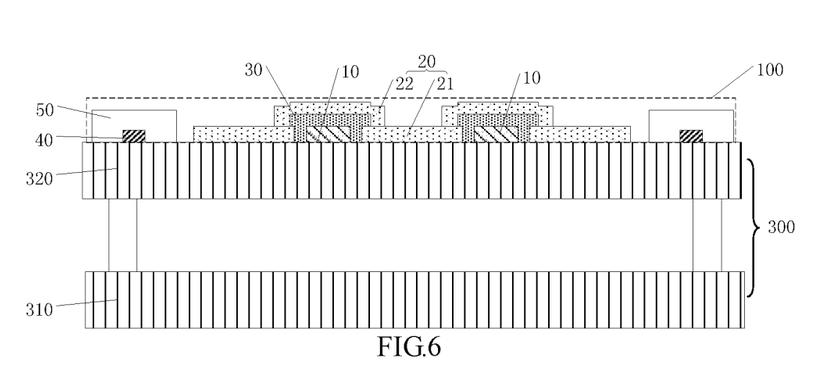
FIG. 6 is a schematic cross-sectional view of a touch device according to the embodiments of the present disclosure.

For example, as shown in FIG. 6, the touch device of at least one embodiment of the present disclosure further includes a display panel 300. The display panel 300 includes an array substrate 310 and an opposite substrate 320 which are opposite to each other. The touch structure 100 is disposed at a side, away from the array substrate 310, of the opposite substrate 320. For example, the touch device is an on-cell type touch device, as shown in FIG. 6. For example, the touch device is an OGS touch device, that is, the touch device further includes a protection substrate at the side, away from the array substrate 310, of the opposite substrate 320, and the touch structure 100 is disposed at the protection substrate and at a side, facing the opposite substrate 320, of the protection substrate.

For example, the touch device provided in the embodiments of the present disclosure includes a display region and a bezel region located at a periphery of the display region, and the touch structure is disposed in the display region.

For example, the touch device is any products or components having the touch control function, such as a touch liquid crystal panel, an electronic paper, a touch OLED (organic light-emitting diode) panel, a mobile phone, a tablet computer, a television set, a display, a notebook computer, a digital photo frame, a navigator and a fingerprint reader.

To sum up, the touch structure, the manufacturing method thereof, and the touch device provided by the embodiments of the present disclosure have the following advantages.

1. Compared with the manner that the connection pattern 2b in the touch structure shown in FIG. 1 adopts the solid metal bridge, the grid connection pattern in the embodiments of the present disclosure is not easily seen by a user, and reduces the occurrence possibility of the electrostatic discharge (ESD) at the connection pattern due to having a relatively small resistance.

2. Compared with the manner of connecting all the electrode patterns together by an integrated and continuous grid structure, the plurality of connection patterns included in the second touch electrode in the embodiments of the present disclosure are not likely to generate the moire phenomenon due to being spaced apart from each other.

3. Compared with the manner that the connection pattern 2b of the touch structure as shown in FIG. 1 adopts the solid ITO conductive bridge, in the touch structure provided by the embodiments of the present disclosure, both the connection patterns and the signal transmission lines are made of the metal material by using the same patterning process, and thus the manufacturing process is simplified and the cost can be reduced.

The following points need to be clarified: (1) the accompanying drawings in the embodiments of the present disclosure relate to only the structures related to the embodiments of the present disclosure, and other structures may refer to general designs; (2) for the sake of clarity, in the drawings of the embodiments of the disclosure, the thicknesses of layers or regions are not drawn to actual scale; and (3) the embodiments of the present disclosure and the features in the embodiments may be combined with each other in case of no conflict.

What are described above is related to the illustrative embodiments of the disclosure only and not limitative to the scope of the disclosure; the scopes of the disclosure are defined by the accompanying claims.

This application claims the benefit of Chinese Patent Application No. 201610972840.3, filed on Nov. 7, 2016, which is hereby entirely incorporated by reference as a part of the present application.

What is claimed is:

1. A touch structure, comprising a first touch electrode and a second touch electrode which are intersected with each other, wherein
the first touch electrode and the second touch electrode are insulated from each other;
the second touch electrode comprises a plurality of electrode patterns spaced apart from each other and a plurality of connection patterns spaced apart from each other, each connection pattern is connected to the electrode patterns which are adjacent to the connection pattern, and each connection pattern comprises a grid pattern while each of the electrode patterns connected to the connection pattern is a solid block-shaped structure without any hollow portions; and
the connection pattern and each of the electrode patterns connected to the connection pattern are respectively provided in different layers.

2. The touch structure according to claim 1, wherein the first touch electrode and has a grid planar shape.

3. The touch structure according to claim 1, further comprising an insulation layer, wherein the insulation layer comprises a portion at an intersection position of the first touch electrode and the second touch electrode, so that the first touch electrode and the second touch electrode are insulated from each other.

4. The touch structure according to claim 1, wherein a material of the connection pattern is different from a material of each of the electrode patterns connected to the connection pattern.

5. The touch structure according to claim 1, further comprising:
a plurality of signal transmission wires respectively connected to the first touch electrode and the second touch electrode.

6. The touch structure according to claim 5, wherein the signal transmission wires and the connection patterns are in a same layer.

7. A touch device, comprising the touch structure according to claim 1.

8. The touch device according to claim 7, further comprising a display panel, wherein the display panel comprises an array substrate and an opposite substrate which are opposite to each other, and the touch structure is at a side, away from the array substrate, of the opposite substrate.

9. The touch structure according to claim 1, wherein each connection pattern comprises a plurality of conducting wires, each conducting wire of the connection pattern is connected with the electrode patterns which are adjacent to the connection pattern, and the plurality of conducting wires form a plurality of hollow portions to form the grid pattern.

10. The touch structure according to claim 9, wherein at least a part of the conducting wires have a zigzag planar shape.

11. The touch structure according to claim 9, wherein a material of the connection patterns comprises a metal.

12. The touch structure according to claim 11, wherein a width of each of the conducting wires is from 4 microns to 6 microns.

13. The touch structure according to claim 9, wherein a material of the connection patterns comprises a transparent conductive metal oxide.

14. The touch structure according to claim 13, wherein a width of each of the conducting wires is from 15 microns to 30 microns.

15. The touch structure according to claim 9, wherein a planar outline shape of each of the hollow portions is a polygon.

16. The touch structure according to claim 15, wherein the plurality of hollow portions comprise a plurality of polygons with different numbers of sides.

17. A manufacturing method of a touch structure, comprising:
   forming a first touch electrode and a second touch electrode which are intersected with each other, wherein
   the first touch electrode and the second touch electrode are insulated from each other;
   the second touch electrode comprises a plurality of electrode patterns spaced apart from each other and a plurality of connection patterns spaced apart from each other, each connection pattern is connected with the electrode patterns which are adjacent to the connection pattern, and a planar shape of each connection pattern comprises a grid pattern while each of the electrode patterns connected to the connection pattern is a solid block-shaped structure without any hollow portions; and the connection pattern and each of the electrode patterns connected to the connection pattern are respectively provided in different layers.

18. The manufacturing method according to claim 17, wherein
   a first conductive film is formed and is subjected to a first patterning process to form the first touch electrode and the plurality of electrode patterns spaced apart from each other;
   an insulation film is formed and is subjected to a second patterning process to form an insulation layer, so that the first touch electrode and the electrode patterns are at a first side of the insulation layer; and
   a second conductive film is formed and is subjected to a third patterning process to form the plurality of the connection patterns spaced apart from each other, wherein each connection pattern has the grid planar shape and comprises a portion formed at a second side of the insulation layer, and the second side is opposite to the first side; and each connection pattern is connected with the electrode patterns which are adjacent to the connection pattern to form the second touch electrode, and the second touch electrode is insulated from the first touch electrode by the insulation layer.

19. The manufacturing method according to claim 17, further comprising:
   forming a plurality of signal transmission wires, wherein the signal transmission wires and the connection patterns are formed by performing a patterning process on a same conductive film, and the signal transmission wires respectively connected with the first touch electrode and the second touch electrode.

20. The manufacturing method according to claim 19, further comprising:
   forming a protection insulation layer to cover at least one of the connection patterns and the signal transmission wires.

* * * * *